United States Patent
Leini

[11] Patent Number: 5,802,946
[45] Date of Patent: Sep. 8, 1998

[54] DRIVE DEVICE FOR CHAIN SAW

[75] Inventor: Arvo Leini, Edsbyn, Sweden

[73] Assignee: Sandvik AB, Sweden

[21] Appl. No.: 897,148

[22] Filed: Jul. 18, 1997

Related U.S. Application Data

[63] Continuation of Ser. No. 610,238, Mar. 4, 1996, abandoned.

[30] Foreign Application Priority Data

Mar. 2, 1995 [SE] Sweden ................................. 9500754

[51] Int. Cl.⁶ ..................................................... B26D 1/46
[52] U.S. Cl. ................................ 83/794; 83/796; 83/928; 30/379.5; 144/34.1
[58] Field of Search .................................... 30/379.5, 381, 30/382, 124; 144/34.1; 83/928, 794, 796, 820

[56] References Cited

U.S. PATENT DOCUMENTS

| | | | |
|---|---|---|---|
| 3,604,479 | 9/1971 | Jordan | 30/379.5 |
| 3,991,799 | 11/1976 | Albright | 144/34.1 X |
| 4,116,250 | 9/1978 | Ericsson | 144/34.1 |
| 4,219,059 | 8/1980 | Albright | 30/379.5 |
| 4,281,693 | 8/1981 | Moulson | 144/34.1 |
| 4,800,936 | 1/1989 | Pomies | 144/34.1 X |
| 4,848,424 | 7/1989 | Wiemeri et al. | 144/34.1 |
| 4,958,670 | 9/1990 | Johnson | 30/379.5 |
| 4,987,935 | 1/1991 | Corcoran et al. | 30/389 X |
| 5,056,224 | 10/1991 | Seigneur | 144/34.1 X |
| 5,103,881 | 4/1992 | Johnson | 30/385 X |
| 5,201,350 | 4/1993 | Milbourn | 83/928 X |

FOREIGN PATENT DOCUMENTS

| | | |
|---|---|---|
| 1676521 | 9/1991 | U.S.S.R. . |
| 2000568 | 1/1979 | United Kingdom . |
| 91/10340 | 6/1992 | WIPO . |
| 95/07806 | 3/1995 | WIPO . |
| 96/26638 | 9/1996 | WIPO . |

*Primary Examiner*—Maurina T. Rachuba
*Attorney, Agent, or Firm*—Burns, Doane, Swecker & Mathis, L.L.P.

[57] ABSTRACT

A drive mechanism for a chain saw has a minimal vertical height. The drive mechanism is particularly useful for timber harvesting vehicles, and includes a drive motor, a holder with a clamping mechanism for clamping a chain saw guide bar, a bearing assembly allowing the holder to rotate in relation to the motor and a swivel device to convey liquid from the motor to the guide bar through closed channels and grooves. The bearing assembly and the swivel device have openings having sufficiently large inner diameters such that the bearing assembly and the swivel device fit around the motor, thereby avoiding the need for mounting those elements on top of one another.

8 Claims, 4 Drawing Sheets

DRIVE DEVICE FOR CHAIN SAW

This application is a continuation of application Ser. No. 08/610,238, filed Mar. 4, 1996, now abandoned.

BACKGROUND AND SUMMARY

Timber harvester vehicles are commonly equipped with a feller head mounted on a mobile boom. The feller head typically comprises a chain saw, gripper arms, feed mechanisms, and measuring equipment.

Two desirable features of a chain saw for timber harvesting are that it be able to cut a tree close to the ground without risk of damage to sensitive saw parts, and that it allow locating two sets of gripper arms as far apart as possible within a limited height of the feller head. The present invention is an improvement upon previous chain saw designs in these respects.

A chain saw forming part of a feller head comprises a drive motor, usually hydraulic, a guide bar with a saw chain, a guide bar holder with clamping means for the clamping end of the guide bar, a bearing to allow rotation of the holder a limited angle relative to the feller head, a torque drive device to apply a torque for rotating the holder, and liquid transfer means to convey liquids such as lubricant, wood preservative or paint between the feller head body and the guide bar. In feller heads according to prior art, the parts of the chain saw are mounted vertically on top of each other. The drive motor is mounted on top and is followed by the bearing, the torque means, the holder and clamping means, the guide bar and the liquid transfer means mounted below the drive motor. As the liquid transfer means are often flexible hoses, these vulnerable parts are generally located close to the ground and are easily damaged by rocks or wood debris.

According to the invention, the total height of the chain saw is reduced to allow a greater distance between the gripper arms and thus a firmer grip on the tree. This is achieved by making the bearing with such a large inner diameter that it can be located concentrically around the drive motor instead of below. The liquid transfer means is made without hoses by means of swivel device with two matching parts with concentric grooves and gaskets, similar in principle to the patent GB 2 000 568 but with a much larger central bore to allow locating it concentrically around the drive motor and the bearing. One of the two matching parts of the liquid transfer means is solidly connected to the holder and has internal, preferably drilled channels to convey the liquids from the liquid transfer means to the clamping means and further into the guide bar, while the other matching part is solidly connected to the motor. This allows working closer to the ground without damage to the liquid supply. The large diameter of the bearing makes it more resistant to vertical loads on the guide bar, and the motor is protected by being surrounded by the bearing and the holder.

BRIEF DESCRIPTION OF THE DRAWINGS

The features and advantages of the present invention are well understood by reading the following detailed description in conjunction with the accompanying drawings in which like numerals indicate similar elements and in which.

DETAILED DESCRIPTION

Timber harvesting vehicles are well known, U.S. Pat. Nos. 4,987,935 and 4,800,936 disclosing examples machines for harvesting timber of the type suited for use in connection with the present invention, and are incorporated by reference.

Figure 1:
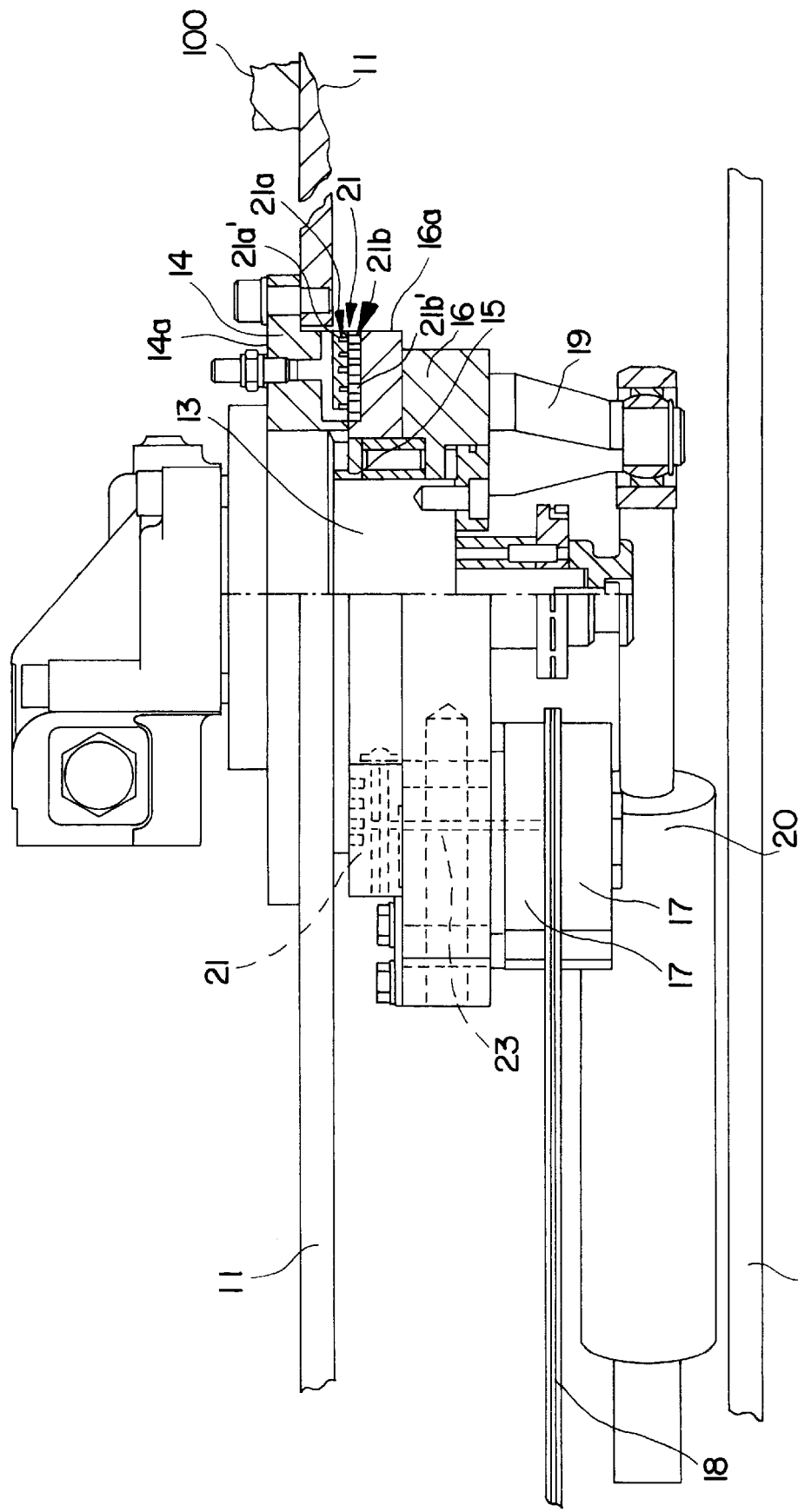
FIG. 1 is a partially cross-sectional view of a portion of a drive device according to an embodiment of the present invention.
Figure 2:
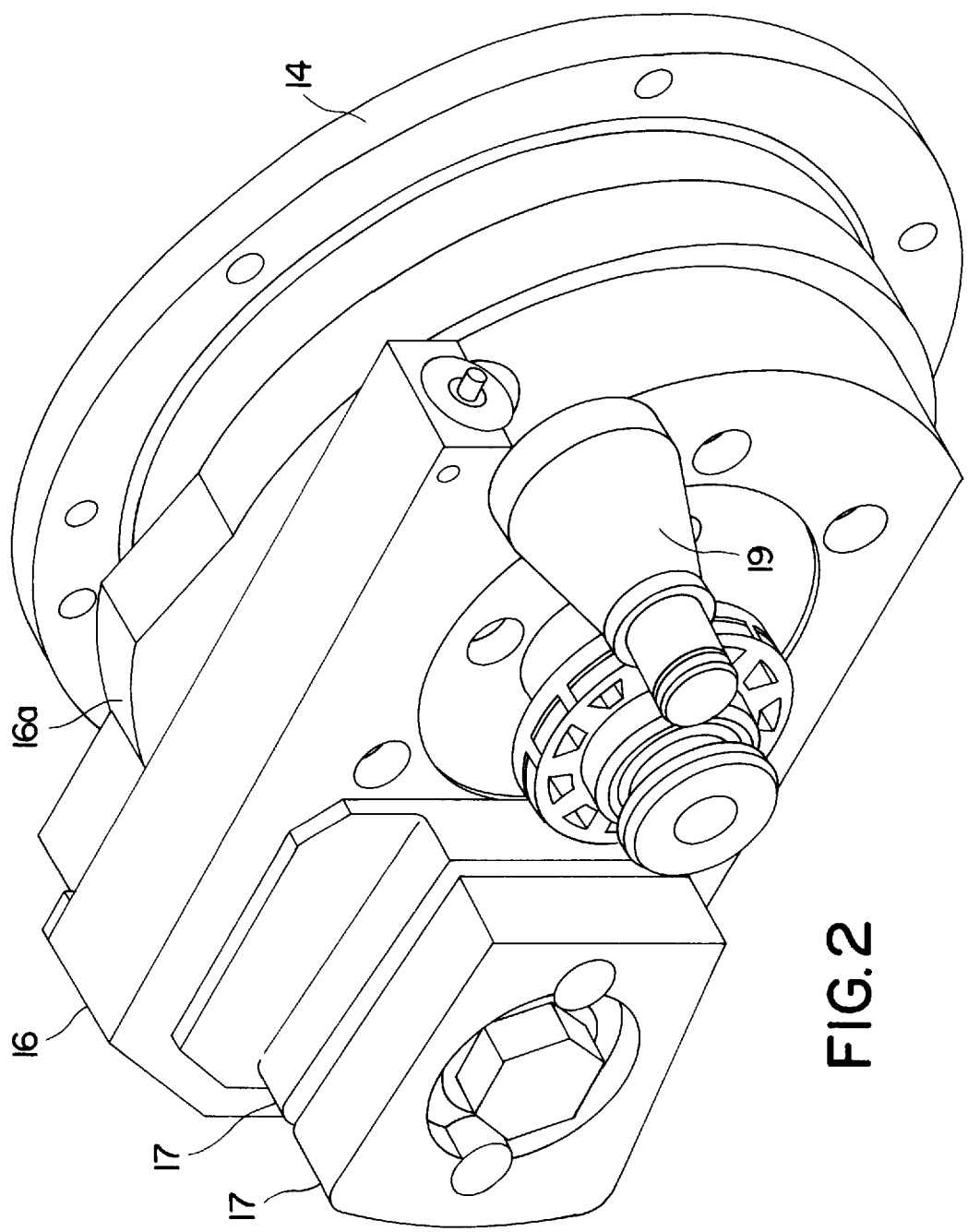
FIG. 2 is a perspective view of a portion of a drive device according to an embodiment of the present invention.
Figure 3:
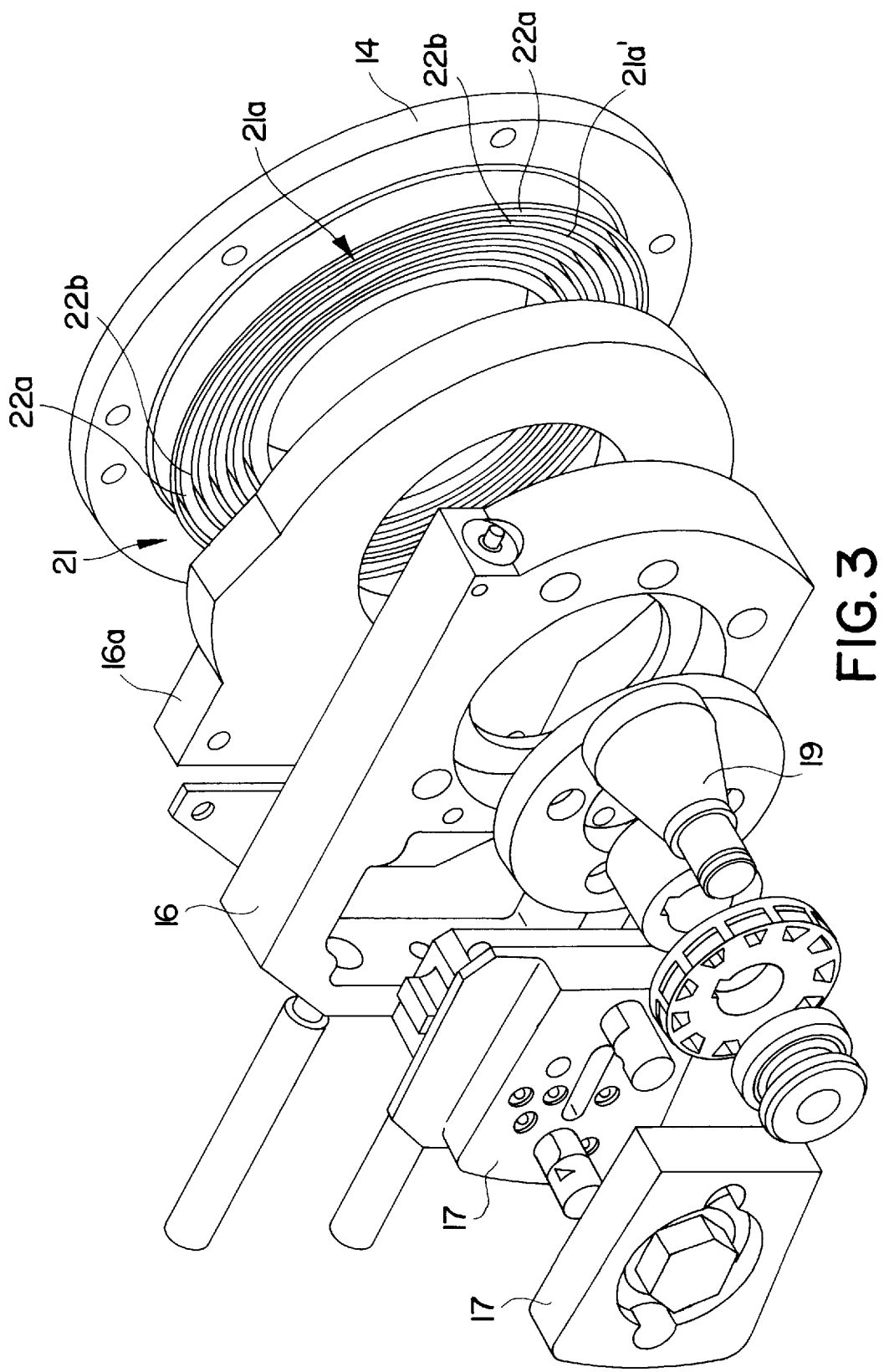
FIG. 3 is an exploded perspective view of a portion of a drive device according to an embodiment of the present invention.

FIG. 1 shows a partially cross-sectional view of a chain saw according to the invention, located between an upper protective plate 11, and a lower protective plate 12, both of which are rigidly attached to the feller head 100 (FIGS. 1 and 4) of a tumber harvesting vehicle (not shown). A drive motor 13 is partly recessed through the upper protective plate 11 and attached to it by a flange 14 such that the flange forms at least part of means for attaching the drive motor 13 to the feller head 100. As seen in FIGS. 1–3, a bearing assembly 15, preferably a roller bearing, is attached to an outside part of the motor 13 below the upper protective plate 11 and allows rotation of a holder 16 concentrically around the drive motor. A suitable motor for use in connection with the present invention is available from VOAC Hydraulics, P.O. Box 943, S-46129 Trollhatten, Sweden. U.S. Pat. No. 5,103,881 discloses a feller head having a large diameter bearing, and is incorporated by reference. The bearing assembly 15 preferably defines an inner opening with a sufficiently large inner periphery, preferably a circular diameter, such that the bearing assembly fits around the motor 13. The underside of the holder 16 carries a clamping means 17 which clamps a guide bar 18 from below and above at a clamping end of the guide bar. To allow tensioning of a saw chain around the guide bar 18, the clamping means 17 is preferably movable in the lengthwise direction of the guide bar.

Figure 4:
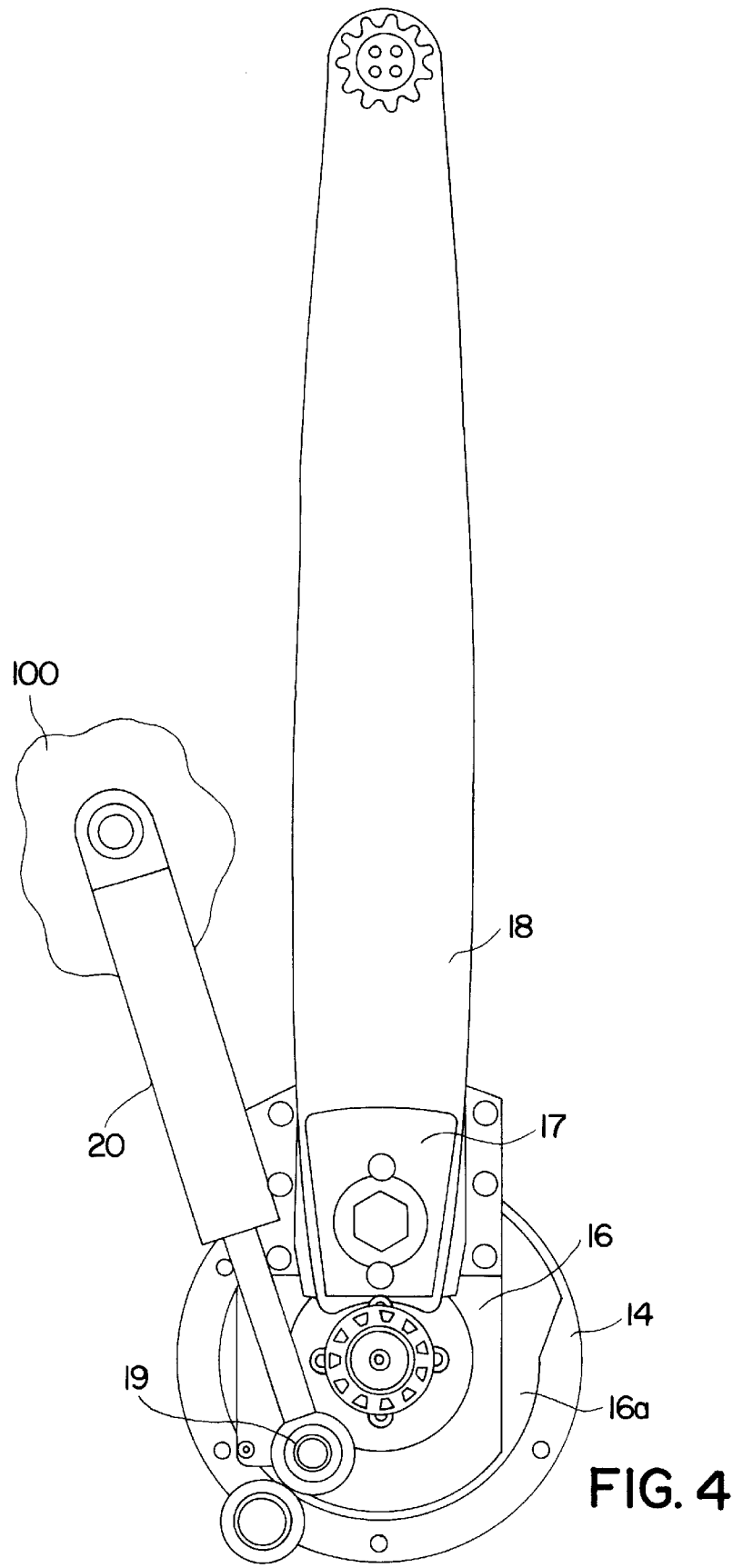
FIG. 4 is a bottom view of a portion of a drive device according to an embodiment of the present invention.

On a lower side of the holder 16 a torque drive device (19, 20) is attached. As seen in FIGS. 1 and 4, the torque drive device includes a pin 19 and a hydraulic cylinder 20 applying a force from the feller head 100 to the pin 19. The end of the hydraulic cylinder 20 not attached to the pin 19 is attached to some fixed part of the feller head 100. The torque drive device 19, 20 may be partly located in the same plane as the clamping means 17. The lower side of the flange 14 of the drive motor 13 and an upper part 16a of the holder 16 are formed with matching parts of a swivel pivot or device 21, i.e., a first matching part 21a of the motor 13 or flange 14 and a second matching part 21b of the upper part 16a of the holder 16. The swivel device has concentric grooves 22a and gaskets 22b to convey liquid from the protected and non-moving upper part 14a of the flange 14 which is safely and easily accessible with hoses or tubes from the feller head and the carrying vehicle. The liquid is further conveyed through channels 23 (shown in FIG. 1 by dotted lines) in the rotatable holder 16 and the clamping means 17 to the guide bar 18. The surfaces 21a' and 21b' of the first and second matching parts 21a and 21b, respectively, of the swivel device 21 are preferably flat or conical to allow controlling of the clearance between under axial loads by means of part of the bearing assembly 15, or means for controlling a clearance being able to support and accommodate axial forces. The first and second matching parts 21a and 21b of the swivel device 21 preferably define an opening having a sufficiently large inner periphery such that the swivel device fits around the motor 13.

The force needed to move the clamping means 17 in the direction of the guide bar 18 to tension the saw chain may be produced by a liquid conveyed from the drive motor through the swivel device 21. This liquid may be a separate liquid supply, or a side function of the lubricant flow or the motor drive fluid.

The total height of the chain saw is reduced in comparison to known chain saws to allow a greater distance between the gripper arms and thus a firmer grip on the tree. This is achieved by making the bearing assembly 15 with such a large inner diameter that it can be located concentrically around the drive motor 13 instead of below. Liquid transfer is provided, without hoses, with the swivel device 21, similar to the manner disclosed in GB 2 000 568, which discloses a coupling for coupling a first set of ducts to a second set of ducts relative to which the first set of ducts is rotatable about an axis, and which includes two bodies which are rotatable about the axis and have a substantially flat interface. According to that document, continuations of the first set of ducts are formed in a first of the bodies and continuations of the second set of ducts are formed in the second of the bodies to communicate with those in the first body in all relative positions of the bodies about the axis of rotation. The swivel device according to the present invention has a sufficiently large central bore to allow it to be located concentrically around the drive motor 13 and the bearing assembly 15. The upper part 16a of the holder 16 has the second matching part 21b of the two first and second matching parts 21a and 21b of the swivel device 21 and is solidly connected to the holder and has internal, preferably drilled channels 23 to convey the liquids from the swivel device to the clamping means 17 and further into the guide bar 18, while the flange 14 having the first matching part 21a of the swivel device is solidly connected to the motor 13. This arrangement allows working closely to the ground without damage to the liquid supply. The large diameter of the bearing assembly 13 makes it highly resistant to vertical loads on the guide bar, and the motor 13 is protected by being surrounded by the bearing assembly 13 and the holder 16. By providing the chain saw having a low height according to the present invention, the lower of the two sets of gripper arms used in timber harvesting equipment can be placed very close to the ground, thereby improving steadiness of a grip on a tree. Low height of the lower gripping arm is, of course, desirable since a slipping tree trunk might damage the saw unit, the vehicle, or the operator.

It is, of course, possible to embody the invention in specific forms other than those described above without departing from the spirit of the present invention. The embodiments shown are merely illustrative and should not be considered restrictive in any way. The scope of the present invention is given in the appended claims, rather than the preceding description, and all variations and equivalents which fall within the range of the claims are intended to be embraced therein.

I claim:

1. A drive device for a chain saw, comprising:

a drive motor including a body and a drive shaft;

a holder pivotably mounted relative to the drive motor, the holder having clamping means for clamping a chain saw guide bar, the holder having an opening, the drive motor being at least partially disposed in the opening in the holder;

a bearing assembly for allowing the holder to rotate relative to the motor, the bearing assembly having an inner opening, the body of the motor being attached directly to the bearing assembly and at least partially disposed inside of the opening in the bearing assembly; and first and second matching parts of a swivel device, the first matching part of the swivel device being attached to the motor and the second matching part of the swivel device forming part of the holder, the first and second matching parts of the swivel device being pivotable relative to each other, the first matching part of the swivel device and the second matching part of the swivel device each having surfaces having concentric grooves, the holder having channels, the grooves in the first and second matching parts of the swivel device and the channels in the holder defining a path for liquid from the drive motor to the guide bar, wherein the first matching part of the swivel device includes an opening and the opening in the holder extends through the second matching part of the swivel device, the motor being at least partially disposed inside of the opening in the first matching part of the swivel device.

2. The drive device according to claim 1, wherein the first matching part of the swivel device forms at least part of means for attaching the motor to a feller head.

3. The drive device according to claim 1, wherein the first matching part of the swivel device forms at least part of a flange.

4. The drive device according to claim 1, wherein the bearing assembly includes means for controlling a clearance between the surfaces of the first and second matching parts of the swivel device when the first and second matching parts of the swivel device are under axial load.

5. The drive device according to claim 4, wherein the surfaces of the first and second matching parts of the swivel device are flat.

6. A drive device for a chain saw, comprising:

a drive motor having a body and a drive shaft;

a flange rigidly attached to the drive motor;

a holder, the holder having clamping means for clamping a chain saw guide bar, and the holder having an opening, the motor being at least partially disposed inside of the opening; and a bearing assembly for pivotally mounting the holder to the flange, the bearing assembly having an opening, the body of the motor being attached directly to and at least partially disposed inside of the opening in the bearing assembly, wherein the flange has an opening, the motor being at least partially disposed inside of the opening in the flange.

7. The drive device according to claim 6, wherein the flange has a surface and the holder has a surface, the surface of the flange and the surface of the holder facing each other and being pivotable relative to each other about a common axis.

8. The drive device according to claim 7, wherein the surface of the flange and the surface of the holder each have grooves, the holder has one or more channels, and the grooves in the surface of the flange and in the surface of the holder and the channels define a path for liquid from the motor to the guide bar.

* * * * *